US012613774B2

(12) United States Patent
Ayyapureddi et al.

(10) Patent No.: US 12,613,774 B2
(45) Date of Patent: Apr. 28, 2026

(54) APPARATUSES AND METHODS FOR SHARED CODEWORD IN 2-PASS ACCESS OPERATIONS

(71) Applicant: Micron Technology, Inc., Boise, ID (US)

(72) Inventors: Sujeet Ayyapureddi, Boise, ID (US); Scott E. Smith, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 102 days.

(21) Appl. No.: 18/743,994

(22) Filed: Jun. 14, 2024

(65) Prior Publication Data

US 2025/0123924 A1 Apr. 17, 2025

Related U.S. Application Data

(60) Provisional application No. 63/590,079, filed on Oct. 13, 2023.

(51) Int. Cl.
*G06F 11/10* (2006.01)
*G06F 11/14* (2006.01)
*G06F 16/38* (2019.01)

(52) U.S. Cl.
CPC ...... *G06F 11/1068* (2013.01); *G06F 11/1016* (2013.01); *G06F 11/1048* (2013.01); *G06F 11/1435* (2013.01); *G06F 16/38* (2019.01)

(58) Field of Classification Search
CPC ............ G06F 11/1068; G06F 11/1016; G06F 11/1048; G06F 11/1435; G06F 16/38
USPC ........ 714/764, 766, 768, 769, 773, 799, 800
See application file for complete search history.

(56) References Cited

U.S. PATENT DOCUMENTS

| | | | |
|---|---|---|---|
| 5,177,705 A | 1/1993 | Mcelroy et al. | |
| 5,299,164 A | 3/1994 | Takeuchi et al. | |
| 5,434,814 A | 7/1995 | Cho et al. | |
| 6,249,476 B1 | 6/2001 | Yamazaki et al. | |
| 7,117,421 B1 | 10/2006 | Danilak | |

(Continued)

FOREIGN PATENT DOCUMENTS

| | | |
|---|---|---|
| WO | 2016048634 A1 | 3/2016 |
| WO | 2024107367 A1 | 5/2024 |

(Continued)

OTHER PUBLICATIONS

U.S. Appl. No. 19/366,908 titled "Apparatuses and Methods for Configurable ECC Modes", filed Oct. 23, 2025; pp. all pages of application as filed.

(Continued)

*Primary Examiner* — John J Tabone, Jr.
(74) *Attorney, Agent, or Firm* — Dorsey & Whitney LLP

(57) ABSTRACT

Apparatuses, systems, and methods for shared codeword in two-pass access operations. The memory may use a read read modify write write (RRMWW) cycle to write data and metadata to the array. Metadata and a data codeword are read out as part of two read access passes and combined into a shared codeword. Error correction is performed on the shared codeword, and then the corrected shared codeword is modified with write data and metadata. Updated parity is generated based on the modified shared codeword and the modified data and updated parity and the metadata are written as two write access passes.

20 Claims, 6 Drawing Sheets

(56)                References Cited

U.S. PATENT DOCUMENTS

| | | | |
|---|---|---|---|
| 8,891,313 B2 | 11/2014 | Chang et al. | |
| 9,158,617 B2 | 10/2015 | Cho et al. | |
| 9,195,537 B2* | 11/2015 | Sharon | G11C 16/10 |
| 9,201,728 B2 | 12/2015 | Patapoutian et al. | |
| 9,361,960 B2 | 6/2016 | Vogelsang | |
| 9,547,550 B1 | 1/2017 | Thakore et al. | |
| 9,607,679 B1 | 3/2017 | Kim et al. | |
| 9,666,291 B2 | 5/2017 | Park | |
| 9,880,901 B2 | 1/2018 | Zastrow | |
| 9,996,799 B2 | 6/2018 | Bostick et al. | |
| 10,127,101 B2 | 11/2018 | Halbert et al. | |
| 10,222,989 B1 | 3/2019 | Zitlaw | |
| 10,243,590 B1 | 3/2019 | Seshadri | |
| 10,810,079 B2 | 10/2020 | Halbert et al. | |
| 10,817,371 B2 | 10/2020 | Rooney et al. | |
| 10,872,011 B2 | 12/2020 | Bains et al. | |
| 10,929,033 B2 | 2/2021 | Meeker et al. | |
| 10,937,517 B1 | 3/2021 | Rich-Plotkin et al. | |
| 10,963,336 B2 | 3/2021 | Veches | |
| 11,010,304 B2 | 5/2021 | Kang et al. | |
| 11,074,126 B2 | 7/2021 | Prather et al. | |
| 11,088,710 B2 | 8/2021 | Lee et al. | |
| 11,177,012 B1* | 11/2021 | Avraham | H03M 13/29 |
| 11,200,961 B1 | 12/2021 | Uribe | |
| 11,264,085 B1 | 3/2022 | Ware et al. | |
| 11,538,515 B2 | 12/2022 | Ji et al. | |
| 11,579,971 B2 | 2/2023 | Ayyapureddi | |
| 11,580,038 B2 | 2/2023 | Norman et al. | |
| 11,615,861 B2 | 3/2023 | Kim et al. | |
| 11,837,316 B1 | 12/2023 | Smith et al. | |
| 12,001,707 B2 | 6/2024 | Boehm et al. | |
| 12,014,797 B2 | 6/2024 | Ayyapureddi | |
| 12,019,513 B2 | 6/2024 | Ayyapureddi | |
| 12,095,474 B1* | 9/2024 | Zhu | H03M 13/03 |
| 12,204,410 B2 | 1/2025 | Sutera et al. | |
| 12,204,770 B2 | 1/2025 | Ayyapureddi | |
| 12,230,347 B2 | 2/2025 | Suh et al. | |
| 12,249,393 B2 | 3/2025 | Reohr | |
| 12,299,291 B2* | 5/2025 | Eilert | G06F 3/0679 |
| 12,475,965 B2 | 11/2025 | Smith et al. | |
| 12,488,853 B2 | 12/2025 | Smith et al. | |
| 2003/0081492 A1 | 5/2003 | Farrell et al. | |
| 2003/0117838 A1 | 6/2003 | Hidaka | |
| 2006/0233030 A1 | 10/2006 | Choi | |
| 2008/0089129 A1 | 4/2008 | Lee | |
| 2008/0313493 A1 | 12/2008 | Roohparvar et al. | |
| 2009/0097348 A1 | 4/2009 | Minzoni et al. | |
| 2009/0132876 A1 | 5/2009 | Freking et al. | |
| 2009/0168523 A1 | 7/2009 | Shirakawa et al. | |
| 2009/0196103 A1 | 8/2009 | Kim et al. | |
| 2010/0177582 A1 | 7/2010 | Kim et al. | |
| 2010/0177587 A1 | 7/2010 | Huang | |
| 2010/0290146 A1 | 11/2010 | Lam | |
| 2011/0154158 A1 | 6/2011 | Yurzola et al. | |
| 2012/0092940 A1 | 4/2012 | Chang et al. | |
| 2013/0117630 A1 | 5/2013 | Kang | |
| 2014/0126300 A1 | 5/2014 | Takahashi et al. | |
| 2015/0193464 A1 | 7/2015 | Kwon et al. | |
| 2015/0262631 A1 | 9/2015 | Shimizu | |
| 2016/0070507 A1 | 3/2016 | Hoshikawa et al. | |
| 2016/0092307 A1 | 3/2016 | Bonen et al. | |
| 2016/0125920 A1 | 5/2016 | Kim et al. | |
| 2016/0307645 A1 | 10/2016 | Kim et al. | |
| 2017/0060681 A1 | 3/2017 | Halbert et al. | |
| 2017/0062067 A1 | 3/2017 | Yang et al. | |
| 2017/0091025 A1 | 3/2017 | Ahn et al. | |
| 2017/0192843 A1 | 7/2017 | Warnes et al. | |
| 2017/0249097 A1 | 8/2017 | Eguchi | |
| 2017/0269992 A1 | 9/2017 | Bandic et al. | |
| 2017/0285990 A1 | 10/2017 | Chen et al. | |
| 2017/0286213 A1 | 10/2017 | Li | |
| 2017/0344423 A1 | 11/2017 | Hsiao et al. | |
| 2018/0025760 A1 | 1/2018 | Mazumder et al. | |
| 2018/0121283 A1 | 5/2018 | Plants | |
| 2018/0150350 A1 | 5/2018 | Cha et al. | |
| 2018/0301203 A1 | 10/2018 | Kim | |
| 2019/0066816 A1 | 2/2019 | Dono | |
| 2019/0073261 A1 | 3/2019 | Halbert et al. | |
| 2019/0103154 A1 | 4/2019 | Cox et al. | |
| 2019/0197171 A1 | 6/2019 | Tiwari et al. | |
| 2019/0206478 A1 | 7/2019 | Jun | |
| 2019/0362792 A1 | 11/2019 | Oh et al. | |
| 2019/0369893 A1 | 12/2019 | Ross | |
| 2019/0371403 A1 | 12/2019 | Maejima | |
| 2020/0019462 A1 | 1/2020 | Prather et al. | |
| 2020/0051616 A1 | 2/2020 | Cho | |
| 2020/0104205 A1 | 4/2020 | Noguchi et al. | |
| 2020/0104208 A1 | 4/2020 | Heo et al. | |
| 2020/0194050 A1 | 6/2020 | Akamatsu | |
| 2020/0226039 A1 | 7/2020 | Lee | |
| 2020/0321060 A1 | 10/2020 | Lang et al. | |
| 2020/0373941 A1 | 11/2020 | Latorre et al. | |
| 2021/0011645 A1 | 1/2021 | Martinelli et al. | |
| 2021/0012817 A1 | 1/2021 | Laurent et al. | |
| 2021/0012849 A1 | 1/2021 | Kim et al. | |
| 2021/0057003 A1 | 2/2021 | Prather et al. | |
| 2021/0064119 A1 | 3/2021 | Mirichigni et al. | |
| 2021/0064282 A1 | 3/2021 | He et al. | |
| 2021/0064461 A1 | 3/2021 | Veches | |
| 2021/0064467 A1 | 3/2021 | Buerkle et al. | |
| 2021/0083687 A1 | 3/2021 | Lee et al. | |
| 2021/0142848 A1 | 5/2021 | Lim et al. | |
| 2021/0142860 A1 | 5/2021 | Song et al. | |
| 2021/0200630 A1 | 7/2021 | Ishikawa et al. | |
| 2021/0208967 A1 | 7/2021 | Cha et al. | |
| 2021/0224155 A1 | 7/2021 | Bains et al. | |
| 2021/0247910 A1 | 8/2021 | Kim et al. | |
| 2021/0272627 A1 | 9/2021 | Lee | |
| 2021/0294692 A1 | 9/2021 | Chen | |
| 2021/0311821 A1 | 10/2021 | Ryu et al. | |
| 2021/0311822 A1 | 10/2021 | Jannusch et al. | |
| 2021/0311830 A1 | 10/2021 | Lee | |
| 2021/0357287 A1 | 11/2021 | Kim et al. | |
| 2021/0358559 A1 | 11/2021 | Suh et al. | |
| 2021/0365316 A1 | 11/2021 | Nale et al. | |
| 2021/0406123 A1 | 12/2021 | Nakanishi et al. | |
| 2022/0027090 A1 | 1/2022 | Kwon et al. | |
| 2022/0035529 A1 | 2/2022 | Bennett | |
| 2022/0084565 A1 | 3/2022 | Prather et al. | |
| 2022/0091938 A1 | 3/2022 | Buerkle et al. | |
| 2022/0129196 A1 | 4/2022 | Roberts et al. | |
| 2022/0138065 A1 | 5/2022 | Secatch et al. | |
| 2022/0197739 A1 | 6/2022 | Ryu et al. | |
| 2022/0261310 A1 | 8/2022 | Ishikawa et al. | |
| 2022/0334917 A1 | 10/2022 | Veches | |
| 2022/0337271 A1 | 10/2022 | Hanna | |
| 2022/0365692 A1 | 11/2022 | Vankamamidi et al. | |
| 2022/0398042 A1 | 12/2022 | Song et al. | |
| 2022/0415398 A1 | 12/2022 | Lien et al. | |
| 2023/0009642 A1* | 1/2023 | Eilert | G06F 3/0607 |
| 2023/0146549 A1 | 5/2023 | Lien et al. | |
| 2023/0161665 A1 | 5/2023 | Choi et al. | |
| 2023/0185665 A1 | 6/2023 | Ayyapureddi | |
| 2023/0223096 A1 | 7/2023 | Bains et al. | |
| 2023/0236747 A1 | 7/2023 | Curewitz et al. | |
| 2023/0289072 A1 | 9/2023 | Cho et al. | |
| 2023/0298682 A1 | 9/2023 | Suh et al. | |
| 2023/0350581 A1 | 11/2023 | Ayyapureddi | |
| 2023/0350748 A1 | 11/2023 | Ayyapureddi | |
| 2023/0352064 A1 | 11/2023 | Ayyapureddi | |
| 2023/0352112 A1 | 11/2023 | Ayyapureddi | |
| 2024/0004754 A1 | 1/2024 | Veches | |
| 2024/0029781 A1 | 1/2024 | Schreck et al. | |
| 2024/0079074 A1 | 3/2024 | Bak et al. | |
| 2024/0086520 A1 | 3/2024 | Kaplan et al. | |
| 2024/0096404 A1 | 3/2024 | Cho et al. | |
| 2024/0126438 A1 | 4/2024 | Suh et al. | |
| 2024/0160351 A1 | 5/2024 | Ayyapureddi et al. | |
| 2024/0160524 A1 | 5/2024 | Ayyapureddi et al. | |
| 2024/0160527 A1 | 5/2024 | Ayyapureddi et al. | |
| 2024/0161855 A1 | 5/2024 | Smith et al. | |
| 2024/0161856 A1 | 5/2024 | Smith et al. | |
| 2024/0161859 A1 | 5/2024 | Ayyapureddi et al. | |
| 2024/0170088 A1 | 5/2024 | Smith et al. | |

(56) References Cited

U.S. PATENT DOCUMENTS

| | | | |
|---|---|---|---|
| 2024/0176699 A1 | 5/2024 | Ayyapureddi et al. | |
| 2024/0177794 A1 | 5/2024 | Vogelsang | |
| 2024/0220142 A1 | 7/2024 | Park | |
| 2024/0220149 A1 | 7/2024 | Kim et al. | |
| 2024/0248796 A1 | 7/2024 | Ayyapureddi | |
| 2024/0256380 A1 | 8/2024 | Ayyapureddi | |
| 2024/0256382 A1 | 8/2024 | Ayyapureddi | |
| 2024/0272979 A1 | 8/2024 | Ayyapureddi | |
| 2024/0272984 A1 | 8/2024 | Ayyapureddi | |
| 2024/0273014 A1 | 8/2024 | Ayyapureddi | |
| 2024/0274223 A1 | 8/2024 | Ayyapureddi | |
| 2024/0281327 A1 | 8/2024 | Ayyapureddi et al. | |
| 2024/0289266 A1 | 8/2024 | Ayyapureddi | |
| 2024/0321328 A1 | 9/2024 | Ayyapureddi | |
| 2024/0377952 A1 | 11/2024 | Song et al. | |
| 2024/0394178 A1 | 11/2024 | Partsch | |
| 2024/0419538 A1 | 12/2024 | Huang et al. | |
| 2025/0077103 A1 | 3/2025 | Ayyapureddi | |
| 2025/0077424 A1 | 3/2025 | Ayyapureddi | |
| 2025/0078906 A1 | 3/2025 | Kim et al. | |
| 2025/0078949 A1 | 3/2025 | Ayyapureddi | |
| 2025/0078950 A1 | 3/2025 | Ayyapureddi | |
| 2025/0110643 A1 | 4/2025 | Ayyapureddi | |
| 2025/0110825 A1 | 4/2025 | Ayyapureddi | |
| 2025/0110830 A1 | 4/2025 | Ayyapureddi | |
| 2025/0111887 A1 | 4/2025 | Ayyapureddi | |
| 2025/0112643 A1 | 4/2025 | Ayyapureddi | |
| 2025/0123924 A1* | 4/2025 | Ayyapureddi | G06F 11/1048 |
| 2025/0138940 A1 | 5/2025 | Cho et al. | |
| 2025/0156087 A1 | 5/2025 | Ayyapureddi | |
| 2025/0165160 A1* | 5/2025 | Eilert | G06F 3/0619 |

FOREIGN PATENT DOCUMENTS

| | | | |
|---|---|---|---|
| WO | 2024107503 A1 | 5/2024 | |
| WO | 2024107504 A1 | 5/2024 | |
| WO | 2024167711 A1 | 8/2024 | |
| WO | 2025053912 A1 | 3/2025 | |
| WO | 2025075696 A1 | 4/2025 | |
| WO | 2025075697 A1 | 4/2025 | |

OTHER PUBLICATIONS

U.S. Appl. No. 19/376,027 titled "Apparatuses and Methods for Single-Pass Access of ECC Information, Metadata Information or Combinations Thereof", filed Oct. 31, 2025; pp. all pages of application as filed.

U.S. Appl. No. 19/381,448 titled "Apparatuses and Methods for Enhanced Metadata Support", filed Nov. 6, 2025; pp. all pages of application as filed.

U.S. Appl. No. 18/745,577 titled "Apparatuses and Methods for Half-Page Modes of Memory Devices" filed Jun. 17, 2024, pp. all pages of the application as filed.

U.S. Appl. No. 18/745,843 titled "Apparatuses and Methods for Half-Page Modes of Memory Devices" filed Jun. 17, 2024, pp. all pages of the application as filed.

U.S. Appl. No. 18/745,877 titled "Apparatuses and Methods for Half-Page Modes of Memory Devices" filed Jun. 17, 2024, pp. all pages of the application as filed.

U.S. Appl. No. 18/745,894 titled "Apparatuses and Methods for Half-Page Modes of Memory Devices" filed Jun. 17, 2024, pp. all pages of the application as filed.

U.S. Appl. No. 18/747,658, titled "Apparatuses and Methods for Bounded Fault Compliant Metadata Storage" filed Jun. 19, 2024, pp. all pages of application as filed.

U.S. Appl. No. 18/747,676, titled "Apparatuses and Methods for Alternate Memory Die Metadata Storage", filed Jun. 19, 2024, pp. all pages of application as filed.

U.S. Appl. No. 18/747,696, titled "Apparatuses and Methods for Scalable 1-PASS Error Correction Code Operations", filed Jun. 19, 2024, pp. all pages of application as filed.

U.S. Appl. No. 18/747,712, titled "Apparatuses and Methods for Granular Single-Pass Metadata Access Operations" filed Jun. 19, 2024, pp. all pages of application as filed.

U.S. Appl. No. 18/747,635, titled "Apparatuses and Methods for Read/Modify/Write Single-Pass Metadata Access Operations" filed Jun. 19, 2024, pp. all pages of application as filed.

U.S. Appl. No. 17/730,381, titled "Apparatuses, Systems, and Methods for Per Row Error Scrub Information", filed Apr. 27, 2022; pp. all pages of application as filed.

U.S. Appl. No. 17/730,396, titled "Apparatuses, Systems, and Methods for Per Row Error Scrub Information Registers", filed Apr. 27, 2022; pp. all pages of application as filed.

U.S. Appl. No. 17/731,024, titled "Apparatuses, Systems, and Methods for Managing Metadata Storage At a Memory", filed Apr. 27, 2022; pp. all pages of the application as filed.

U.S. Appl. No. 18/424,282 titled "Apparatuses and Methods for Bounded Fault Compliant Metadata Storage" filed Jan. 26, 2024; pp. all pages of application as filed.

U.S. Appl. No. 18/424,342 titled "Apparatuses and Methods for Bounded Fault Compliant Metadata Storage" filed Jan. 26, 2024; pp. all pages of application as filed.

U.S. Appl. No. 18/430,381, titled "Apparatuses, Systems, and Methods for Storing Memory Metadata", filed Feb. 1, 2024; pp. all pages of application as filed.

U.S. Appl. No. 18/430,406, titled "Apparatuses, Systems, and Methods for Storing Memory Metadata", filed Feb. 1, 2024; pp. all pages of application as filed.

U.S. Appl. No. 18/431,232, titled "Apparatuses, Systems, and Methods for Storing Memory Metadata", filed Feb. 2, 2024; pp. all pages of application as filed.

U.S. Appl. No. 18/431,306, titled "Apparatuses, Systems, and Methods for Storing Memory Metadata", filed Feb. 2, 2024; pp. all pages of application as filed.

U.S. Appl. No. 18/441,775 titled "Apparatuses and Methods for Settings for Adjustable Write Timing" filed Feb. 14, 2024, pp. all pages of the application as filed.

U.S. Appl. No. 18/441,830 titled "Apparatuses, Systems, and Methods for Storing and Accessing Memory Metadata and Error Correction Code Data" filed Feb. 14, 2024, pp. all pages of the application as filed.

U.S. Appl. No. 18/504,215 titled "Apparatuses and Methods for Enhanced Metadata Support" filed Nov. 8, 2023; pp. all pages of application as filed.

U.S. Appl. No. 18/504,234 titled "Apparatuses and Methods for Enhanced Metadata Support" filed Nov. 8, 2023; pp. all pages of application as filed.

U.S. Appl. No. 18/504,302 titled "Apparatuses and Methods for Configurable ECC Modes" filed Nov. 8, 2023; pp. all pages of application as filed.

U.S. Appl. No. 18/504,316 titled "Apparatuses and Methods for Configurable ECC Modes" filed Nov. 8, 2023; all pages of application as filed.

U.S. Appl. No. 18/504,324 titled "Apparatuses and Methods for Single-Pass Access of ECC Information, Metadata Information or Combinations Thereof" filed Nov. 8, 2023, all pages of application as filed.

U.S. Appl. No. 18/504,342 titled "Apparatuses and Methods for Single-Pass Access of ECC Information, Metadata Information or Combinations Thereof" filed Nov. 8, 2023; pp. all pages of application as filed.

U.S. Appl. No. 18/504,353 titled "Apparatuses and Methods for Separate Write Enable for Single-Pass Accessof Data, Metadata, and Parity Information" filed Nov. 8, 2023; pp. all pages of application as filed.

U.S. Appl. No. 18/504,362 titled "Apparatuses and Methods for Separate Write Enable for Single-Pass Access of Data, Metadata, and Parity Information" filed Nov. 8, 2023; pp. all pages of application as filed.

U.S. Appl. No. 18/625,539, titled "Apparatuses, Systems, and Methods for Per Row Error Scrub Information" filed Apr. 3, 2024, pp. all pages of application as filed.

(56) References Cited

OTHER PUBLICATIONS

U.S. Appl. No. 17/730,992 titled "Apparatuses, Systems, and Methods for Managing Metadata Security and Access" filed Apr. 27, 2022, pp. all pages of application as filed.

Lumenci Team "High Bandwidth Memory (HBM3)" https://lumenci.com/blogs/high-bandwidth-memory; Editorial Team at Lumenci, Jul. 14, 2022; pp. 1-3.

U.S. Appl. No. 19/360,159 titled "Apparatuses and Methods for Enhanced Metadata Support" filed Oct. 16, 2025; pp. all pages of the application as filed.

U.S. Appl. No. 19/025,934, titled "Apparatuses, Systems, and Methods for Managing Metadata Security and Access" filed Jan. 16, 2025, pp. all pages of application as filed.

PCT Application No. PCT/US24/39192 titled "Apparatuses and Methods for Scalable 1-Pass Error Correction Code Operations" filed Jul. 23, 2024, pp. all pages of the application as filed.

PCT Application No. PCT/US24/39195 titled "Apparatuses and Methods for Half-Page Modes of Memory Devices" filed Jul. 23, 2024, pp. all pages of the application as filed.

PCT Application No. PCT/US24/39231 titled "Apparatuses and Methods for Granular Single-Pass Metadata Access Operations" filed Jul. 24, 2024, pp. all pages of the application as filed.

Chen et al., "CATCAM: Constant-time Alteration Ternary CAM with Scalable In-Memory Architecture"; 2020 53rd Annual IEEE/ACM International Symposium on Microarchitecture (MICRO), Athens, Green; Oct. 17-21, 2020; pp. 342-355.

J. F. Philippe Marchand "An Alterable Programmable Logic Array"; IEEE Journal of Solid-State Circuits, vol. sc-20, No. 5, Oct. 1985; pp. 1061-1066.

U.S. Appl. No. 19/431,541, titled "Apparatuses And Methods For Bounded Fault Compliant Metadata Storage" filed Dec. 23, 2025, US.03, pp. all pages of application as filed.

U.S. Appl. No. 19/435,124 titled "Apparatuses, Systems, and Methods for Storing Memory Metadata", filed Dec. 29, 2025; pp. all page of the application as filed.

U.S. Appl. No. 19/441,648, titled "Apparatuses, Systems, and Methods for Storing and Accessing Memory Metadata and Error Correction Code Data" filed Jan. 6, 2026; pp. all pages of application as filed.

Handy, Jim, "Emerging Memories Today: Understanding Bit Selectors", The Memory Guy Blog, Objective Analysis on Semiconductor Memories, Nov. 2018, 5 pgs.

* cited by examiner

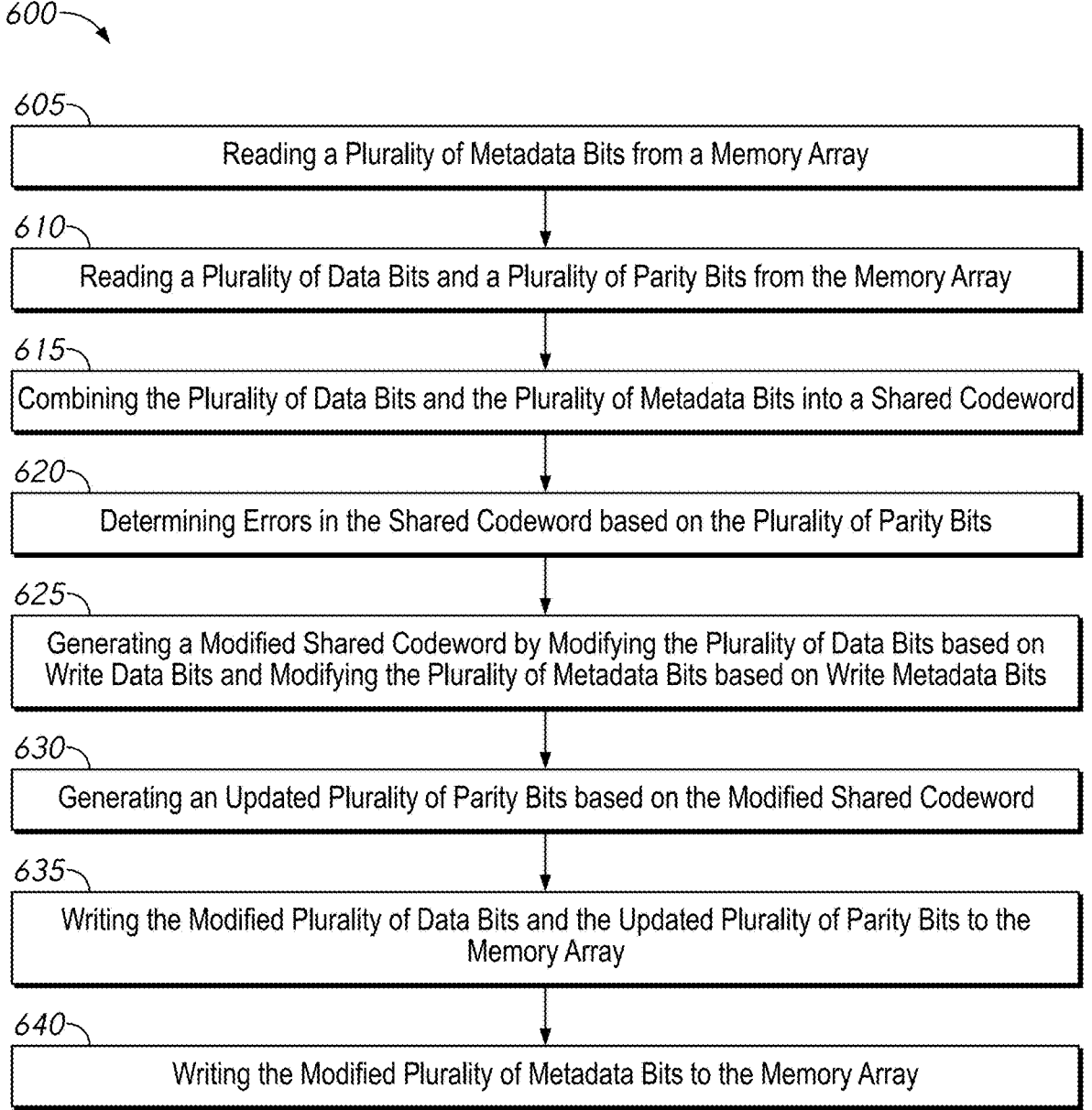

600

605
Reading a Plurality of Metadata Bits from a Memory Array

610
Reading a Plurality of Data Bits and a Plurality of Parity Bits from the Memory Array 615
Combining the Plurality of Data Bits and the Plurality of Metadata Bits into a Shared Codeword 620
Determining Errors in the Shared Codeword based on the Plurality of Parity Bits 625
Generating a Modified Shared Codeword by Modifying the Plurality of Data Bits based on Write Data Bits and Modifying the Plurality of Metadata Bits based on Write Metadata Bits 630
Generating an Updated Plurality of Parity Bits based on the Modified Shared Codeword 635
Writing the Modified Plurality of Data Bits and the Updated Plurality of Parity Bits to the Memory Array 640
Writing the Modified Plurality of Metadata Bits to the Memory Array

FIG. 6

APPARATUSES AND METHODS FOR SHARED CODEWORD IN 2-PASS ACCESS OPERATIONS

CROSS REFERENCE TO RELATED APPLICATION(S)

This application claims the benefit under 35 U.S.C. § 119 of the earlier filing date of U.S. Provisional Application Ser. No. 63/590,079 filed Oct. 13, 2023 the entire contents of which are hereby incorporated by reference in its entirety for any purpose.

BACKGROUND

This disclosure relates generally to semiconductor devices, and more specifically to semiconductor memory devices. In particular, the disclosure relates to volatile memory, such as dynamic random access memory (DRAM). Information may be stored on individual memory cells of the memory as a physical signal (e.g., a charge on a capacitive element). During an access operation, an access command may be received along with address information which specifies which memory cells should be accessed. Memory devices may be packaged together onto a module, and the module may have error correction capabilities for at least some of the information stored on the memory device.

There is a growing interest in enabling the memory to store information in the array which is associated with pieces of data. For example, error correction information and/or metadata may be stored in the array along with their associated data. Storing additional information may come with tradeoffs. For example, there may be a tradeoff between space and performance when storing additional information. There may be a need to balance these tradeoffs.

BRIEF DESCRIPTION OF THE DRAWINGS

FIG. 6 is a flow chart of a method of writing data to a memory device according to some embodiments of the present disclosure.

DETAILED DESCRIPTION

Figure 1:
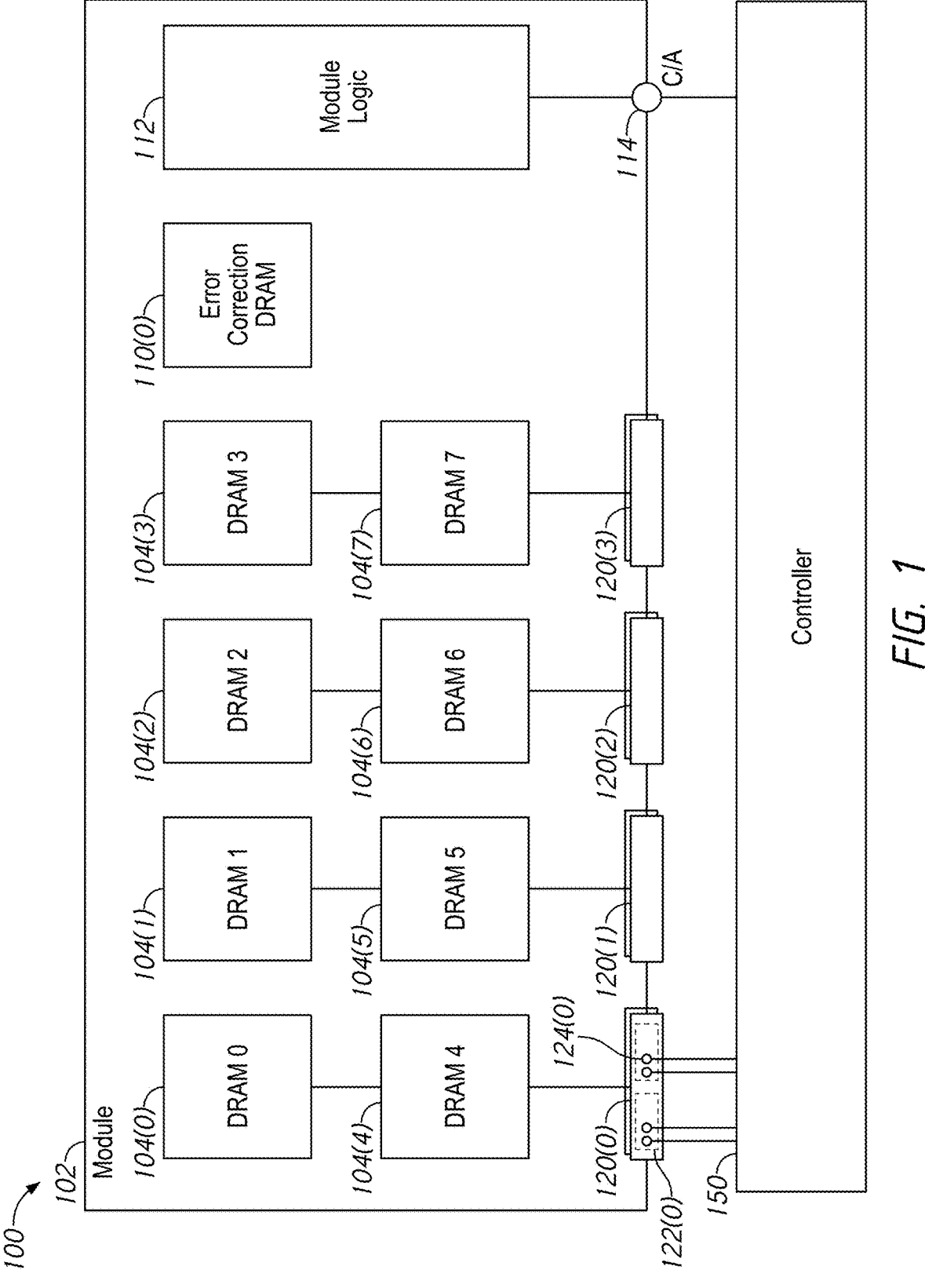
FIG. 1 is a block diagram of a memory system according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Memory arrays may generally include a number of memory cells arranged at the intersection of word lines (rows) and bit lines/digit lines (columns). The columns may be grouped together into column planes, and a column select (CS) signal may be used to select a set of columns within each of the active column planes to provide data. When an access command is received, the memory may prefetch a codeword (e.g., a number of bits of data) along with one or more associated bits from the memory and either replace the prefetched data with new data (e.g., as part of a write operation) or provide the prefetched data off the memory device (e.g., as part of a read operation). Some memory modes may involve providing less than all of the prefetched data off the memory device. For example, in a conventional memory device, in certain modes half of the prefetched data may be provided off the device, and the remainder may ignored.

Memory devices may store additional information which is associated with each codeword. For example, the additional information may include parity bits which are used as part of an error correction scheme, metadata which includes information about the data codeword (or is a portion of information about a larger set of data which includes the codeword), or combinations thereof.

As used herein, the term data may represent any bits of information that the controller wishes to store and/or retrieve from the memory. The term metadata may represent any bits of information about the data which the controller writes to and/or receives from the memory. For example, the metadata may be information that the controller generates about the data, about how or where the data memory is stored in the memory, about how many errors have been detected in the data, etc. The data and the metadata together represent information written to the memory by a controller and then also read from the memory by the controller, with the data and metadata differing in content and how they are generated in that the metadata is based on information about the data. The term parity may represent any bits generated by an error correction circuit of the memory based on the data, metadata, or combinations thereof. The parity may generally stay within the memory. In some embodiments, the amount of data and/or metadata retrieved as part of a single access operation may represent a set of bits which are a fragment of a larger piece of information. For example, the metadata bits retrieved as part of a single access operation (e.g., 4 bits) may not have any meaning on their own, but may have meaning when combined with sets of metadata bits retrieved as part of other access operations (e.g., to other memory arrays and/or to the same array at different times).

The memory device may be capable of reading and writing up to a maximum number of bits in a single access pass. In a memory device, to accommodate metadata, a one-pass architecture may be used, which takes up more space in the array or a two-pass architecture may be used which decreases performance (e.g., increases a latency between operations) but takes up less space. In an example two-pass write operation in a conventional memory the memory receives data and metadata. A first access pass reads out a codeword (e.g., 128 bits) and its associated parity which are checked for errors by an error correction code (ECC) circuit. The corrected codeword is modified to include the data and new parity is generated. The modified codeword and new parity is written back to the array. In a second access pass, a second codeword and its associated parity is read out and corrected and the corrected second codeword is modified, new parity is generated and the modified corrected second codeword and parity is written to the array. However, this may be inefficient, both due to the use of two separate cycles through the ECC circuit and due to the large number of extra bits read out in the second codeword compared to the number of new metadata bits.

The present disclosure is drawn to apparatuses, systems, and methods for a shared codeword in a 2-pass access operation. A memory device of the present disclosure uses a two-pass architecture with a shared codeword including both data and metadata which passes through the ECC circuit. During an example write operation of the present disclosure, responsive to a write command, metadata is read out, and then data and parity are read out. The data and metadata are combined into a shared codeword, and the shared codeword is associated with the parity (e.g., the parity is based on both data and metadata together). The shared codeword and parity are provided to the ECC circuit which determines if there are errors. One or more bits of the corrected metadata is overwritten with the new metadata, and one or more bits of the corrected data is overwritten with the new data to form a modified shared codeword. The modified shared codeword is provided to the ECC circuit which generates updated parity. The modified data and updated parity are written to the array and then the modified metadata is written to the array. This cycle may be referred to as a read-read-modify-write-write (RRMWW) cycle.

As used herein 'two-pass' may be used broadly to refer to operations where the data and the metadata are separately read and written to the memory array. However, four individual access operations (e.g., two reads and two writes) are performed as part of a two-pass RRMWW cycle responsive to an access command. The first read and last write may represent a first pass (to read the metadata and then write it to the array) and the second read and first write may represent a second pass (to read the data and parity and write the data and parity).

FIG. 1 is a block diagram of a memory system according to some embodiments of the present disclosure. The memory system 100 includes a memory module 102 and a controller 150 which operates the memory module 102. The module includes a number of memory devices 104 and 110. The memory devices 104 may be used to store data and may generally be referred to as data memory devices 104, while the memory device 110 is used to correct errors in data read from the data memory devices 104. The memory device 110 may be referred to as an error correction memory device 110. A module logic 112 receives commands and addresses over a command/address C/A bus from the controller 150 through a C/A terminal 114 and distributes those commands and addresses to the memory devices 104 and 110 over internal command and address buses (not shown). Data is communicated between the controller 150 and the module 102 along data buses which couple to data terminals (DQ) terminals 124 of the module 102. The data terminals 124 are organized into pseudo-channels 122 and channels 120. Each channel is a set of data terminals 124 associated with a memory device 104.

FIG. 1 shows an example 9x2p2 memory module 102 which may be used to implement some embodiments of the present disclosure. In the 9x2p2 architecture, there are nine total memory devices 104 and 110. Eight data memory devices 104(0) to 104(7) and one error correction memory device 110. Each channel 120(0) to 120(7) includes one or more pseudo-channels 122, which may be operated independently of each other. In this embodiment, each channel 120 includes two pseudo-channels 122, each of which includes two data terminals 124. Since the memory devices and channels may generally be similar to each other, only a single device 104(0) and its associate channel 120(0) are described in detail herein. In order to simplify the layout of the figure, an arrangement of two rows of four devices 104 each is shown, and their associated channels 120 are shown as stacked boxes. However the representation of FIG. 1 does not necessarily represent the layout of a physical device. For example, a single row of 8 devices 104 may be used. Similarly, various buses and signal lines have been simplified down to a single line for clarity on the drawing, however, multiple physical signal lines may be represented by a single line in the drawing. Other architectures of memory module 102 may be used in other example embodiments. For example, a 10x2p2 architecture may be used (which adds another error correction device) or any other architecture with more or fewer terminals per pseudo-channel, more or fewer pseudo-channels per channel, and/or more or fewer devices per module.

During an example write operation, the controller 150 provides a write command and addresses (e.g., row, column, and/or bank addresses as explained in more detail herein) over the C/A terminal 114 to the module 102. The module logic 112 distributes the command and address to the data memory devices 104(0) to 104(7). The controller 150 also provides data to be written along the various DQ channels 120(0) to 120(7). Since the pseudo-channels 122 may be operated independently, we will consider a single pseudo-channel 122 and its two DQ terminals 124. Each data terminal receives a serial burst of bits, which together represent a codeword of data. For example, each terminal receives 32 data bits in series, for a total of 64 data bits per device and 512 bits of data per access operation across the module 102.

The controller 150 may also provide metadata bits. How many metadata bits are stored may be a setting of the controller 150 and module 102. For the sake of example, the present disclosure will generally be explained with respect to embodiments where 8 bytes of metadata or 4 bytes of metadata are used. The same physical device may handle either 8 or 4 bytes of metadata, which may vary based on settings. More or fewer bytes of metadata (e.g., 1, 2, 6, 10, etc.) may be used in other example embodiments.

The metadata bytes are distributed across the data devices 104 of the module. Since there are 8 total data devices 104, each device 104 may receive a number of bits of metadata equal to the number of byes (e.g., 4 or 8 bits) along with the 64 data bits. A first DQ terminal 120 may receive 32 data bits and a first half of the metadata bits (e.g., 2 or 4) while a second DQ terminal 120 may receive 32 data bits and a second half of the metadata bits. In some embodiments, the burst may be organized so that the data and metadata are sequential (e.g., 32 consecutive data bits and then 2 metadata bits). Other arrangements of the burst may be used in other example embodiments (e.g., metadata first, metadata interspersed among the data bits, etc.). The data is written to locations in the memory array specified by the address in the data memory devices 104.

During an example read operation, the controller 150 provides a read command and addresses along the C/A terminal 114. The module logic 112 distributes these to the memory devices 104 to 110 and data and metadata is read out from the locations specified by the addresses. Each DQ terminal 124 provides 32 bits of read data and half of the read metadata bits, for a total of 64 data bits per device 104 and 4 or 8 bits of metadata per device 104.

The read and write operations may use two-pass architecture as a RRMWW cycle to store both the data (as well as parity generated based on the data and metadata) along with the metadata bits. Each memory device may be capable of accessing up to 136 bits in a single access pass (e.g., generally 128 data bits and 8 parity bits). In the 9x2p2 architecture, a number D data bits (e.g., 64 data bits) plus some number MD of metadata bits (e.g., either 4 or 8) are used (along with some number P of parity bits, for example 8 parity bits). Since the number D is generally less than 128 bits, the memory may access an initial (or data) codeword of 128 bits, which includes the data currently stored in the locations specified by the column address, as well as additional information from locations which are not currently being written to. For example, the data codeword may include 128 bits, half of which represent the locations where the D data bits are going to be written to. The memory may also retrieve initial metadata bits from a location where the metadata is going to be written to. Similar to the data codeword, the retrieved metadata may include additional bits from locations which are not being written to. The data codeword and metadata bits are combined to form a shared codeword, which is used for internal error correction as described in more detail herein. The shared codeword is modified to include the D data bits and MD parity bits received along the channel 120, and then written back to the memory array with two write operations.

During an example read operation, the error correction memory device 110 may be used to identify and correct errors in the data. The error correction memory device 110 may support correction of the data and metadata along one DQ terminal (e.g., the 34 or 36 bits provided along one of the terminals 124 in a pseudo-channel). The controller 150 may use information stored on the error correction memory device 110 to enable correction of the information after the information is received by the controller 150 during a read operation. For example, the error correction memory device 110 may store repair information (e.g., parity bits) which are associated with the data and metadata read out across all the data devices 104(0) to 104(3), and that parity may be used by a repair circuit (not shown) of the controller 150 to enable correction in the data and metadata of up to one of the DQ terminals. For example, if the data and metadata being provided along a first DQ terminal in a first pseudo-channel associated with memory 104(0) is corrupted, then the error correction device 110 enables the repair of that data and metadata. However, if the errors exist in bits across both DQ terminals in the pseudo-channel then correction may not be possible. This may operate in parallel with the error correction performed within each memory device 104.

Figure 2:
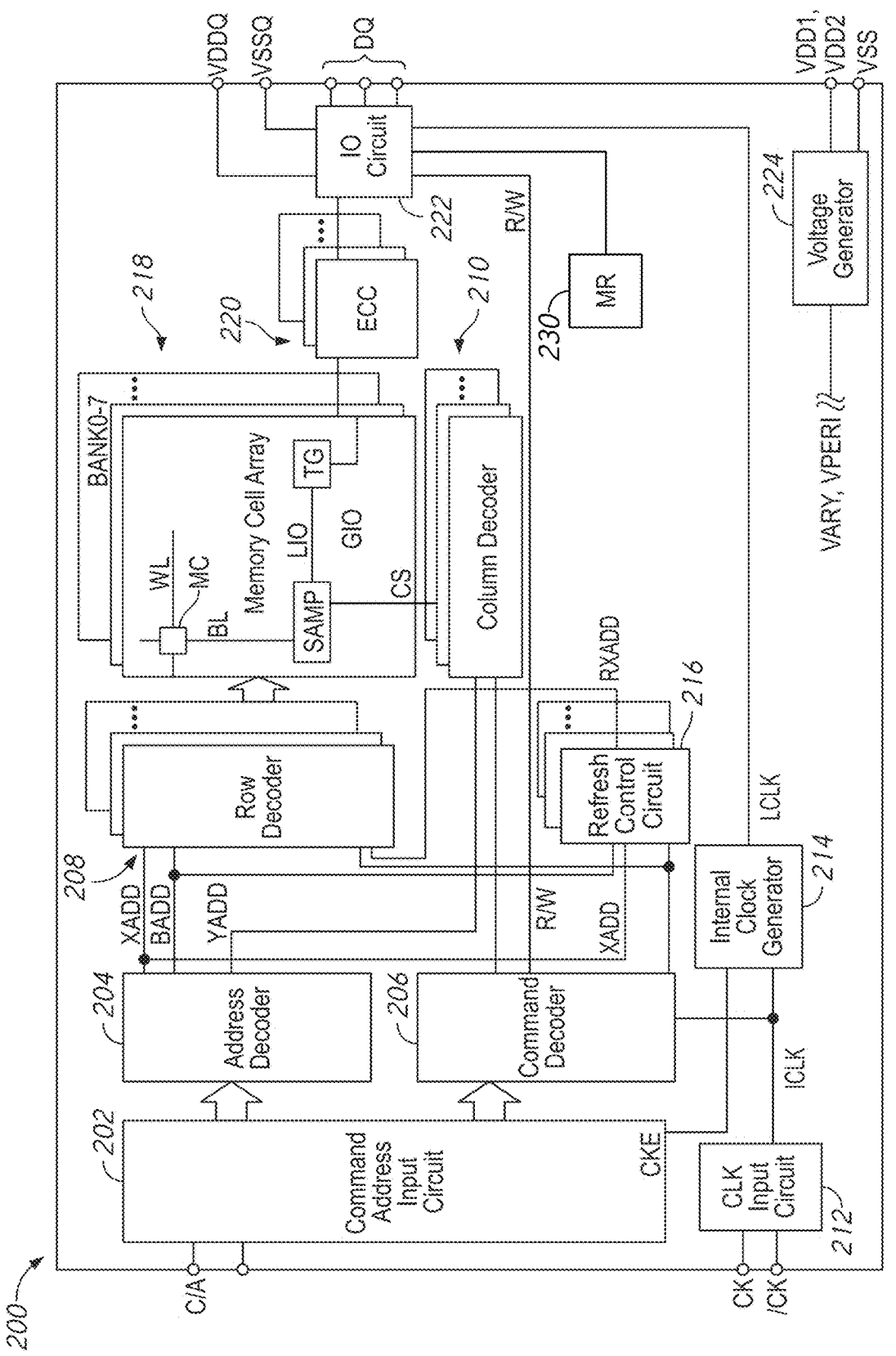
FIG. 2 is a block diagram of a semiconductor device according an embodiment of the disclosure.

FIG. 2 is a block diagram of a semiconductor device according an embodiment of the disclosure. The semiconductor device 200 may be a semiconductor memory device, such as a DRAM device integrated on a single semiconductor chip. For example, the device 100 may implement one of the devices 204 of the module 202 of FIG. 2.

The semiconductor device 200 includes a memory array 218. The memory array 218 is shown as including a plurality of memory banks. In the embodiment of FIG. 2, the memory array 218 is shown as including eight memory banks BANK0-BANK7. More or fewer banks may be included in the memory array 218 of other embodiments.

Each memory bank includes a plurality of word lines WL, a plurality of bit lines BL, and a plurality of memory cells MC arranged at intersections of the plurality of word lines WL and the plurality of bit lines BL. The selection of the word line WL is performed by a row decoder 108 and the selection of the bit lines BL is performed by a column decoder 210. In the embodiment of FIG. 2, the row decoder 208 includes a respective row decoder for each memory bank and the column decoder 210 includes a respective column decoder for each memory bank.

The bit lines BL are coupled to a respective sense amplifier (SAMP). Read data from the bit line BL is amplified by the sense amplifier SAMP, and transferred to an ECC circuit 220 over local data lines (LIO), transfer gate (TG), and global data lines (GIO). Conversely, write data outputted from the ECC circuit 220 is transferred to the sense amplifier SAMP over the complementary main data lines GIO, the transfer gate TG, and the complementary local data lines LIO, and written in the memory cell MC coupled to the bit line BL.

The semiconductor device 200 may employ a plurality of external terminals, such as solder pads, that include command and address (C/A) terminals coupled to a command and address bus to receive commands and addresses, clock terminals to receive clocks CK and/CK, data terminals DQ coupled to a data bus to provide data, and power supply terminals to receive power supply potentials VDD, VSS, VDDQ, and VSSQ. The external terminals may couple directly to the controller (e.g., 150 of FIG. 1) and/or may couple to various buses/connectors of the module (e.g., 102 of FIG. 1).

The clock terminals are supplied with external clocks CK and/CK that are provided to an input circuit 212. The external clocks may be complementary. The input circuit 212 generates an internal clock ICLK based on the CK and/CK clocks. The ICLK clock is provided to the command decoder 206 and to an internal clock generator 214. The internal clock generator 214 provides various internal clocks LCLK based on the ICLK clock. The LCLK clocks may be used for timing operation of various internal circuits. The internal data clocks LCLK are provided to the input/output circuit 222 to time operation of circuits included in the input/output circuit 222, for example, to data receivers to time the receipt of write data. The input/output circuit 222 may include a number of interface connections, each of which may be couplable to one of the DQ pads (e.g., the solder pads which may act as external connections to the device 200).

The C/A terminals may be supplied with memory addresses. The memory addresses supplied to the C/A terminals are transferred, via a command/address input circuit 202, to an address decoder 204. The address decoder 204 receives the address and supplies a decoded row address XADD to the row decoder 208 and supplies a decoded column address YADD to the column decoder 210. The decoded row address XADD may be used to determine which row should be opened, which may cause the data along the bit lines to be read out along the bit lines. The column decoder 210 may provide a column select signal CS, which may be used to determine which sense amplifiers provide data to the LIO. The address decoder 204 may also supply a decoded bank address BADD, which may indicate the bank of the memory array 218 containing the decoded row address XADD and column address YADD.

The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 202. The command decoder 206 includes circuits to decode the internal command signals to generate various internal signals and commands for performing operations. For example, the command decoder 206 may provide signals which indicate if data is to be read, written, etc.

The device 200 may receive an access command which is a write command. When the write command is received, and a bank address, a row address and a column address are timely supplied with the write command, write data and write metadata supplied to the data terminals DQ by the controller is provided along the data bus and written to memory cells in the memory array 218 corresponding to the row address and column address. The write command is received by the command decoder 206, which provides internal commands to manage the writing the data and metadata as part of a two-pass RRMWW operation. The command decoder 206 provides a first read command and the column decoder 210 provides a first column select CS to activate bit lines of the array 218 and read out initial metadata bits, which are stored in a latch (not shown in FIG. 2). The command decoder 206 then provides a second read command and the column decoder provides a second CS signal to activate bit lines of the array 218 and read out a data codeword and parity bits. The metadata in the latch and the data codeword are combined into a shared codeword and the ECC circuit 220 determines errors in the shared codeword based on the parity. For example, the ECC circuit 220 may perform single error correction (SEC) or other types of error correction/detection. The corrected shared codeword is then modified to include the received metadata and data from the IO circuit 222. The ECC circuit 220 then generates new parity based on the modified shared codeword. The modified shared codeword is split and the modified metadata is stored in the latch. The command decoder 206 provides a write command and the column decoder 210 provides the second CS signal and the modified data codeword from the modified shared codeword and the updated parity are written to the array 218. The command decoder 206 then provides a second write command and the column decoder 210 provides the first CS signal and the modified metadata from the latch is stored in the array 218.

The device 200 may receive an access command which is a read command. When a read command is received, and a bank address, a row address and a column address are timely supplied with the read command, read data is read from memory cells in the memory array 218 corresponding to the row address and column address. The read command is received by the command decoder 206, which provides internal commands that the data and metadata from the memory array 218 read out to the DQ terminals. The command decoder 206 issues a first read command and the column decoder 210 provides a first CS signal to retrieve the metadata. The command decoder 206 issues a second read command and the column decoder 210 provides a second CS signal to retrieve the data codeword and parity. The data codeword and metadata are combined into a shared codeword and the ECC circuit 220 determines errors based on the shared codeword and parity. The portions of the shared codeword which represent the retrieved data and metadata (which may be less than all of the data codeword bits and/or read metadata bits) are then provided by the IO circuit 222 to the DQ terminals.

The device 200 includes refresh control circuits 216 each associated with a bank of the memory array 218. Each refresh control circuit 216 may determine when to perform a refresh operation on the associated bank. The refresh control circuit 216 provides a refresh address RXADD (along with one or more refresh signals, not shown in FIG. 1). The row decoder 208 performs a refresh operation on one or more word lines associated with RXADD. The refresh control circuit 216 may perform multiple types of refresh operation, which may determine how the address RXADD is generated, as well as other details such as how many word lines are associated with the address RXADD.

The ECC circuit 220 may detect and/or correct errors in the accessed data. As part of a write operation, the ECC circuit 220 may receive bits from the IO circuit 222 and generate parity bits based on those received bits. The received bits and parity bits are written to the memory array 218. During an example read operation, the ECC circuit 220 receives a set of bits and their associated parity bits from the array 218 and uses them to locate and/or correct errors. For example, in a single error correction (SEC) scheme, up to one bit of error may be located and detected. In a single error correction double error detection (SECDED) scheme, up to one bit of error may be corrected, but two errors may be detected (although the bits causing those errors are not individually located, so no correction can be made). The ECC circuit 220 may correct the information and then provide the corrected information (and/or a signal indicated detected errors) to the IO circuit 222. The parity bits may generally not be provided to the IO circuit 222.

The mode register 230 may include various settings, and may be used to enable a metadata mode of the memory 200. When metadata is enabled, the device 200 may store metadata which is associated with the data. For example, as part of a write operation the controller may provide data along with its associated metadata, and as part of a read operation may receive data and its associated metadata. The mode register 230 may store settings which determine how many bits of metadata are used.

The memory 200 may be operated in various modes based on a number of the DQ pads which are used. In some embodiments, the mode register 230 may include settings which determine how many DQ pads are used, even if there are more DQ pads available. The mode may determine both how many DQ pads the controller expects to send/receive data along, as well as the format and/or number of bits which the controller expects as part of a single access command. For example, the memory may have 16 physical DQ pads. In a 2p2 mode, four of those DQ pads are used, divided into two pseudo-channels of two DQ pads each. The mode may also determine a burst length at each DQ terminal as part of a DQ operation. The burst length represents a number of serial bits at each DQ terminal during an access operation. For example, in the 2p2 mode, each data terminal may receive a burst of 32 data bits plus some number of metadata bits. When two bytes of metadata are enabled, then the burst length may be 34 along each terminal.

The power supply terminals are supplied with power supply potentials VDD and VSS. The power supply potentials VDD and VSS are supplied to an internal voltage generator circuit 224. The internal voltage generator circuit 224 generates various internal potentials VARY, and the like based on the power supply potentials VDD and VSS supplied to the power supply terminals.

The power supply terminals are also supplied with power supply potentials VDDQ and VSSQ. The power supply potentials VDDQ and VSSQ are supplied to the input/output circuit 222. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 3:
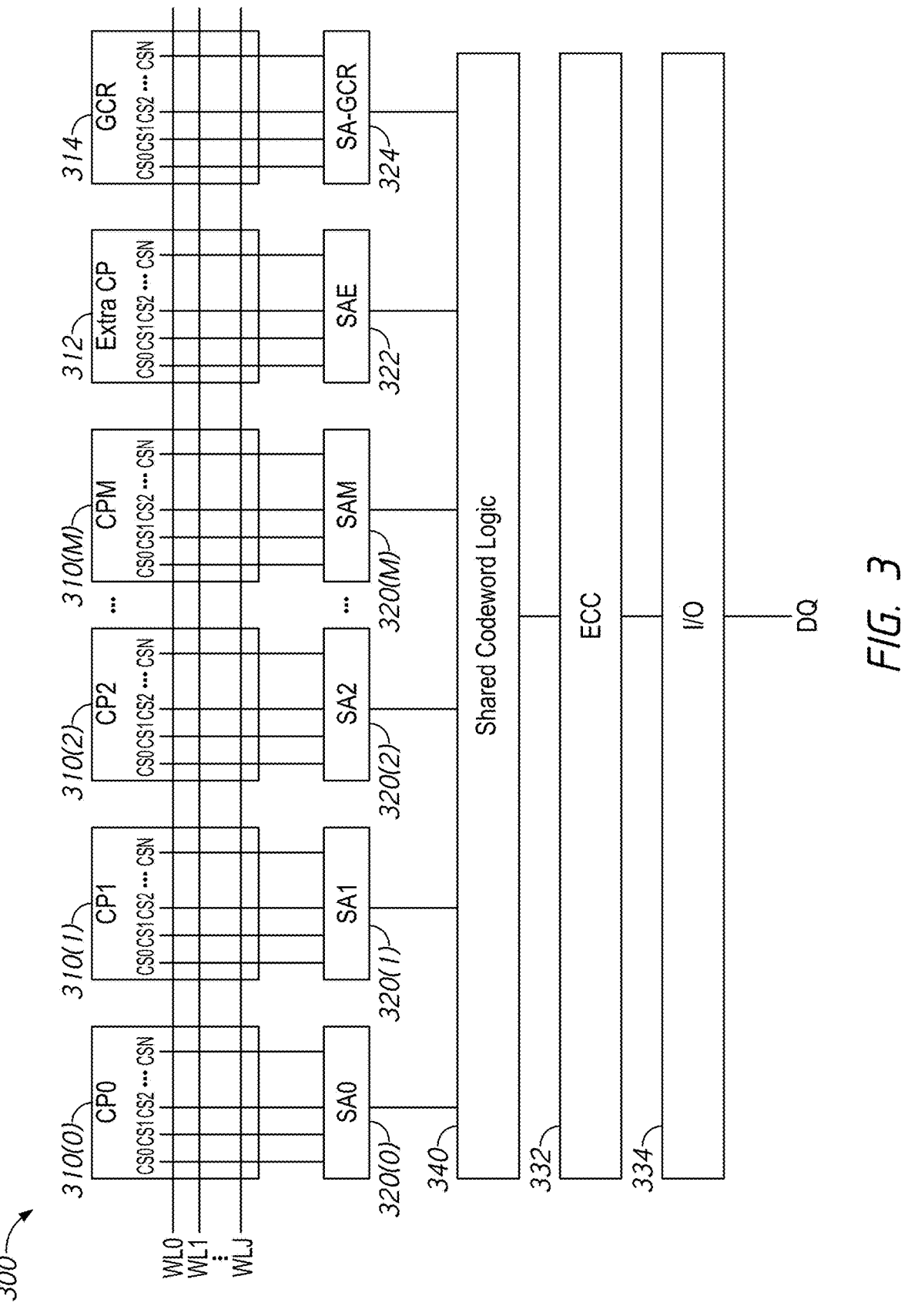
FIG. 3 is a block diagram of a memory device according to some embodiments of the present disclosure.

FIG. 3 is a block diagram of a memory device according to some embodiments of the present disclosure. The memory device 300 may, in some embodiments, represent a portion of the memory device 200 of FIG. 2. The view of FIG. 3 shows a portion of a memory array 310-314 and 320-324 which may be part of a memory bank (e.g., 218 of FIG. 2) along with selected circuits used in the data path such as a shared codeword logic circuit 340, the ECC circuit 332 (e.g., 220 of FIG. 2) and IO circuits 334 (e.g., 222 of FIG. 2). For clarity certain circuits and signals have been omitted from the view of FIG. 3. The shared codeword logic circuit 340 represents one or more components which may be used to store and/or modify all or part of the shared codeword or its parts as described in more detail herein.

The memory device 300 is organized into a number of column planes 310-314. Each of the column planes represents a portion of a memory bank. Each column plane 310-314 includes a number of memory cells at the intersection of word lines WL and bit lines. The bit lines may be grouped together into sets which are activated by a value of a column select (CS) signal. For the sake of clarity, only a single vertical line is used to represent the bit lines of each column select set, however, there may be multiple columns accessed by that value of CS. For example, each line may represent 8 bit lines, all accessed in common by a value of CS. As used herein, a 'value' of CS may refer to a decoded signal provided to sets of bit lines. So a first value may represent a first value of a multibit CS signal, or after decoding a signal line associated with that value being active. The word lines may be extend across multiple of the column planes 310-314.

The memory 300 includes a set of data column planes 310 as well as an extra column plane 312. The extra column plane 312 may be used to store additional information, such as error correction parity bits or metadata bits.

In some embodiments, the memory 300 may also include an optional global column redundancy (GCR) column plane 314. In some embodiments, the GCR plane 314 may have fewer memory cells (e.g., fewer column select groups) than the data column planes 310. The GCR CP 314 includes a number of redundant columns which may be used as part of a repair operation. If a value of the CS signal is identified as including defective memory cells in one of the data column planes 310, then the memory may be remapped such that the data which would have been stored in that column plane for that value of CS is instead stored in the GCR CP 314.

In an example embodiment, the memory 310 may include 16 data column planes 310(0)-310(15). Each of those data column planes 310 includes 64 sets of column selects activated by a value of the column select signal, and each set of column select includes 8 bit lines. Accordingly, when a word line is opened responsive to a row address, and a column select signal is provided to each of the 16 column planes then 8 bits are accessed from each of the 16 column planes for a total of 128 bits. A column select signal is also provided to the extra column plane 312, although that column select signal may be a different value than the one provided to the data column planes 310 for an additional 8 bits. If a repair has been performed, the GCR CP 314 may also be accessed and the value on a GCR LIO may be used while ignoring the LIO of the column plane it is replacing. Accordingly, the maximum number of bits that can be retrieved as part of an access pass is 128 bits from the data column planes 310 (with 8 bits substituted from the GCR CP 314 if there has been a repair) along with 8 additional bits from the extra CP 312.

In the 2p2 architecture, fewer than 128 bits of data are written or read for a given access operation. However, in the two-pass RRMWW architecture, a data codeword may still be read out from each of the data column planes 310. In this example embodiments, that means that the data codeword will include 128 bits (e.g., 8 from each of the 16 data column planes 310), while the accessed data represents 64 bits. Which bits of the data codeword which are accessed may be done on a column plane by column plane basis. The column address may include a column plane select bit or bits which are used to determine which portion of the data column planes 310 are used to store the data bits accessed in a given operation. For example, the data column planes 310 may be split into two sets of eight data column planes each. A bit of the column address (e.g., CA10) may be used as the column plane select bit and may choose which set of data column planes is being used as part of the current access operation.

The metadata may be stored in a selected one of the data column planes 210. Similar to how the data codeword is accessed, the column decoder may provide a CS signal to a selected one of the data column planes 210 which may access 8 bit lines. Unlike accessing the data codeword, when the metadata bits are accessed, the CS signal may only be provided to the selected column plane 210. Accordingly, fewer bit lines may be activated when the metadata is accessed than when the data codeword is accessed. In embodiments where fewer than 8 bits of metadata are used by the device, then some of those accessed bit lines may be extraneous (e.g., similar to how only half of the data codeword represents the locations of the accessed data). For example, if 8 bytes of metadata (e.g., 8 bits per device) are used, then all 8 of the accessed bits may represent locations where metadata is accessed. If 4 bytes of metadata (e.g., 4 bits per devices) are used, then only half of the accessed bits represent locations where metadata is accessed. In some embodiments, separate write enable signals (e.g., even and odd write enable signals) may be used such that when 4 bytes of metadata are used, only the four bit lines where the metadata is being written are active. The metadata may be stored in one of the column planes selected by the column plane select bit or in a non-selected plane.

In some embodiments of the present disclosure, the parity bits may be store either in the extra column plane 312 or in one of the non-selected column planes. In an example implementation, each set of 64 data bits may be associated with 8 bits of parity generated by the ECC circuit 332. However, the extra column plane 312 may not have space for all of the parity bits. Accordingly, some parity bits may be stored in the extra column plane 312 and some may be stored in the data column planes 310 similar to the metadata (although the metadata and parity may be stored in different column planes for a given set of data bits).

In an example write operation, a controller (e.g., 150 of FIG. 1) provides data and metadata to the memory device which are written as part of a two-pass RRMWW cycle. In the example embodiment discussed herein, 64 bits of data are provided along with 8 bits of metadata, such that each of the two DQ terminals per pseudo-channel receives a burst length of 36 (32 data bits and 4 metadata bits). A word line is activated based on the row address by the row decoder. The selected column plane where the metadata is stored is activated. For the sake of this example, the column decoder provides the CS signal CSN to the column plane CP0 310(0) and 8 bits of metadata are read out from the memory cells at the intersection of the word line and the active bit lines in that column plane 310(0). The metadata may be stored in latch (e.g., in the shared codeword logic circuit 340). Then the column decoder provides the signal CS0 to all of the column planes 310 and 312 and a 128 bit data codeword is read out from the data column planes 310 while 8 parity bits are read out from the extra column plane 312 from the memory cells at the intersection of the word line and the bit lines activated by CS0 in those column planes 310 and 312. The shared codeword logic circuit 340 combines the data codeword with the metadata bits to form a 136 bit shared codeword. The ECC circuit 332 determines errors in the shared codeword based on the parity bits. The shared codeword is then modified by the shared codeword logic circuit 340 such that half of the data bits are overwritten (e.g., with which half based on a state of CA10) and the 8 bits of read metadata is overwritten with the 8 bits of write metadata to form a modified shared codeword with 72 bits of new information and 64 bits leftover from the data codeword. The ECC circuit 332 generates new parity based on the modified shared codeword. The modified shared codeword is then split by the shared codeword logic circuit 340 into a modified data codeword and modified metadata. The modified metadata may be stored in the latch. The column decoder provides CS0 and the modified data codeword is written to the data column planes 310 while the updated parity is written to the extra column plane 312 at the intersections of the active word line and the memory cells associated with CS0 in the column planes 310 and 312. The column decoder provides CSN to CP0 310(0) and modified metadata is written to the memory cells at the intersection of the active word line and the bit lines associated with CSN.

In some embodiments, if fewer than 8 bits of metadata per device are used, since 8 bit lines are activated by each CS value, and there are fewer metadata bits written, it may be useful to protect the remaining bits associated with that value of CS in that column plane so they are not erroneously overwritten. For example, separate write enable signals may be used such that only some of the sense amplifiers associated with the CS value are modified at one time (rather than all 8). For example, only the sense amplifiers associated with the bitlines which will store the new metadata bits may be activated. This may prevent the data on the bit lines coupled to the non-related sense amplifiers from being modified without requiring additional operations (e.g., a read/modify/ write cycle). Other options for protecting the non-accessed bits associated with the CS signal may be used in other example embodiments.

Figure 4:
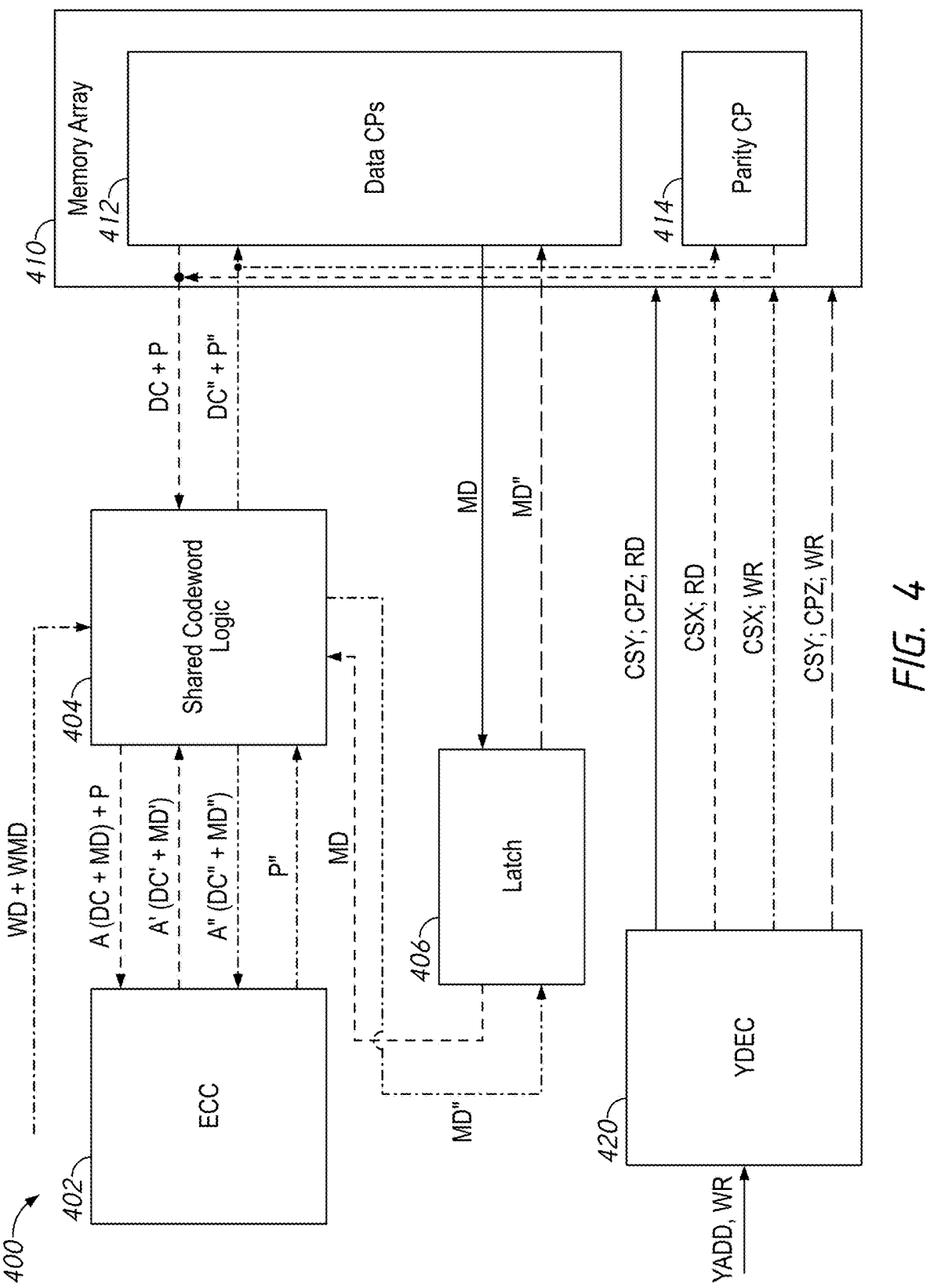
FIG. 4 is a block diagram of a write operation according to some embodiments of the present disclosure.

FIG. 4 is a block diagram of a write operation according to some embodiments of the present disclosure. The block diagram of FIG. 4 shows a memory device 400, which may implement portions of the memory devices 104-110 of FIG.

1, 200 of FIG. 2, and/or 300 of FIG. 3 in some embodiments. The view of the memory device 400 omits certain components and signals for the sake of clarity. The view of FIG. 4 shows the flow of data, metadata and parity during an example write operation. FIG. 4 shows an ECC circuit 402 (e.g., 220 of FIG. 2 and/or 332 of FIG. 3), a column decoder 420 (e.g., 210 of FIG. 2), a memory array 410 (e.g., 218 of FIG. 2) which includes data column planes 412 and an extra or parity column plane 414 (e.g., 310 and 312 respectively of FIG. 3). Also shown is a shared codeword logic circuit 404 (e.g., 340 of FIG. 3) and a latch 406. For the sake of clarity the latch is shown as a separate component, but in some embodiments the latch 406 may be included in the shared codeword logic circuit 404.

During an example write operation, a controller provides a column address YADD and a write command WR. The controller also provides write data WD and metadata write WMD along data terminals. A command decoder provides the decoded write command to the column decoder 420, which also receives the decoded address YADD from an address decoder. The column decoder 420 provides a sequence of column select signals and read (RD) and write (WR) commands to the array 410. The sequence of individual commands may form a RRMWW cycle as part of the overall write operation.

During a first read, the column decoder 420 provides the column select signal CSY along with a read command to the array 410. The array retrieves metadata MD from a selected column plane at the intersection of the bit lines designated by a Yth column select value CSY in the selected column plane. The column plane is selected by a signal CPZ, which selects a Zth one of the data column planes 412. The column plane may be selected based on the row address, for example the column decoder 420 may include mapping which associates certain column select signals in certain column planes with certain column addresses for storing the metadata associated with data stored at the location of that column address. The metadata bits MD are stored in the latch 406.

During a second read, the column decoder 420 provides the column select signal CSX along with a read command RD. In the second read, no specific column plane is selected so instead, each of the data column planes 412 and the parity column plane 414 retrieve information from the memory cells at the intersection of the word line and the bit lines identified by Xth CS signal. A data codeword DC is read out from data column planes 412 and parity bits P are read out from the parity CP 414.

The shared codeword logic circuit 404 receives the data codeword DC and the metadata MD from the latch 406 and combines them into a shared codeword A. The shared codeword logic 404 provides the shared codeword A along with the parity P to the ECC circuit 402, which checks for errors in the shared codeword A based on the parity P. The ECC circuit provides a corrected shared codeword A', which includes a corrected data codeword DC' and corrected metadata MD'.

The shared codeword logic 404 receives the write data WD and write metadata WMD from the IO circuit. The shared codeword logic 404 modifies the corrected shared codeword A' to include the write data WD and WMD to become modified shared codeword A". All or a portion of the corrected data codeword DC' may be modified (e.g., overwritten) to include the write data WD to become the modified data codeword DC". All or a portion of the corrected medata MD' may be modified (e.g., overwritten) to include the write metadata WMD to become the modified metadata MD". The modified shared codeword A" is made from the modified data codeword DC" and the modified metadata MD". The modified shared codeword A" is provided to the ECC circuit 402 which generates updated parity P" based on the modified shared codeword A". The modified shared codeword A" is split and the modified metadata MD" is stored in the latch 406.

As part of a first write, the column decoder 420 provides the column select signal CSX (e.g., the same one used during the second read) and a write command. Responsive to this the modified data codeword DC" and updated parity P" are written to the array. The data codeword DC" is written to the memory cells at the intersection of the word line and the bit lines in each data column plane 412 activated by CSX, while the parity P" is written to the memory cells in the parity CP 414.

As part of a second write, the column decoder 420 provides the column select signal CSY (e.g., the same one used as part of the first read) to the selected column plane CPZ and a write command. Responsive to this, the modified metadata MD" from the latch 406 is written to the selected column plane CPZ at the intersection of the word line and the bit lines associated with CSY.

In an example embodiment, the data codeword DC (and DC' and DC") may include 128 bits (e.g., 8 from each of 16 column planes) and the parity P (and P") may represent 8 bits. The metadata MD (and MD' and MD") represents 8 bits. The write data WD represents 64 bits (e.g., two bursts of 32 bits along two data terminals) and the write metadata WMD represents either 4 or 8 bits. Accordingly, the shared codeword logic 404 may overwrite half the bits of the data codeword DC' with the write data WD. One or more bits of the column address YADD (e.g., a column plane select bit such as CA10) may be used to select which of the bits of the data codeword are overwritten (e.g., which column planes will be used to hold the write data WD).

In some embodiments, 8 bits of write metadata may be used and the write metadata WMD may replace the modified MD'. In other words the modified metadata MD" may be the write metadata WMD. In some embodiments, there may be 4 bits of write metadata WMD. Accordingly, similar to the data codeword, the metadata MD' may be modified such that a portion of the bits of MD' are overwritten with the write metadata WMD. Similar to the data codeword, one or more bits of the column address (such as the column plane select bit) may be used to determine which bits of MD' are overwritten with WMD to form MD".

Figure 5:
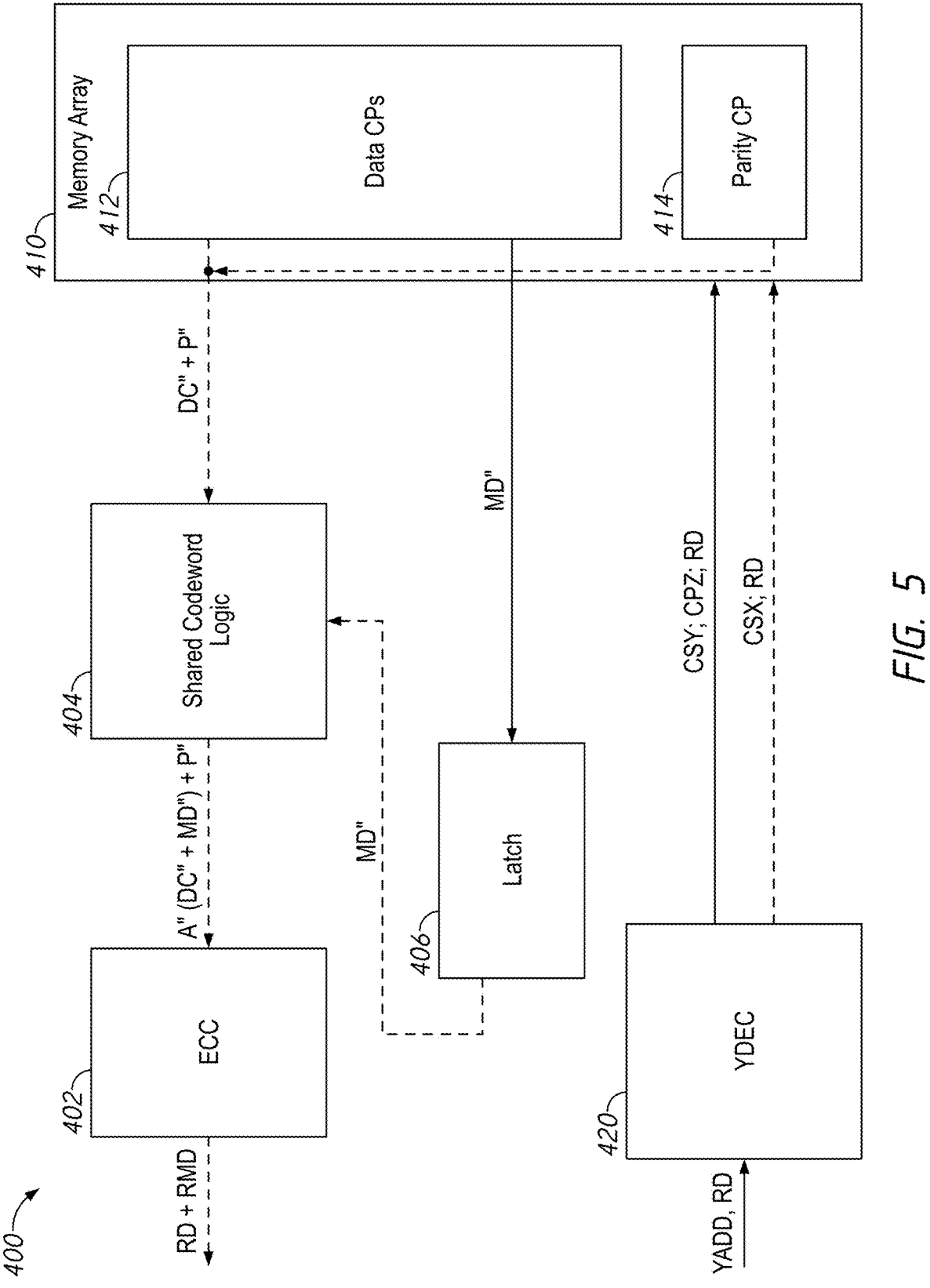
FIG. 5 is a block diagram of an example read diagram according to some embodiments of the present disclosure.

FIG. 5 is a block diagram of an example read diagram according to some embodiments of the present disclosure. For the sake of explanation, FIG. 5 shows a read operation on the same data and metadata which was written in FIG. 4. Accordingly, FIG. 5 uses the same reference numbers as used in FIG. 4. For the sake of brevity, certain details which were already described with respect to FIG. 4 will not be explained again with respect to FIG. 5.

The column decoder 420 receives a read command along with a column address YADD. As part of a first read, the column decoder 420 issues a column select signal CSY to the selected column plane CPZ along with a read command. Accordingly, the modified metadata MD" is rad out from the selected column plane CPZ of the data column planes 412 and stored in the latch 406. As part of a second read, the column decoder 420 issues a column select signal CSX to all column planes 412 and 414 along with a read command. Accordingly, the modified data codeword DC" is read out from the data column planes 412 along with the updated parity P" from the parity CP 414.

The shared codeword logic circuit 404 combines the read data codeword DC" and read metadata MD" into a shared codeword A" and provides the shared codeword A" and parity P" to the ECC circuit 402. The ECC circuit 402 determines if there are errors in the shared codeword A" based on the parity, and provides the corrected read data RD (e.g., which may be a portion of the corrected data codeword DC") and provides corrected read metadata RMD (which may be all or a portion of the metadata MD" after it is corrected) to the IO circuit.

For example, using the numbers given in the example described with respect to FIG. 4, if the data codeword is 128 bits, then the ECC circuit 402 may only provide 64 of those bits as the read data MD. If the read metadata RMD is 8 bits, then all the bits of MD" (after they are corrected) may be provided to the IO circuit. If the read metadata is 4 bits, then half of MD" (post correction) is provided.

FIG. 6 is a flow chart of a method of writing data to a memory device according to some embodiments of the present disclosure. The flow chart 600 may, in some embodiments, be implemented by one or more of the apparatuses or systems described herein, such as the memory devices of FIGS. 1-5.

The method 600 may be performed responsive to receiving a write command along with row and column addresses from a controller. The method 600 may include receiving, with a column decoder, a decoded write command and decoded column address and performing the steps of the method 600 responsive thereto.

The method 600 begins with box 605 which describes reading a plurality of metadata bits from a memory array. The method 600 may include providing, with a column decoder, a column select signal with a first value to selected column plane of the memory array and reading the metadata bits from the selected column plane.

Box 605 is followed by box 610, which describes reading a plurality of data bits and a plurality of parity bits from the memory array. The method 600 may include providing, with the column decoder, the column select signal with a second value. The data may be read from each of the data column planes, and the parity may be read from an extra column plane.

Box 610 is followed by box 615, which describes combining the plurality of data bits and the plurality of metadata bits into a shared codeword. For example, if there are 128 bits in the data and 8 bits in the metadata then the shared codeword may be 136 bits.

Box 615 is followed by box 620 which describes determining errors in the shared codeword based on the plurality of parity bits. For example, an ECC circuit may perform single error correction (SEC) or another type of error correction on the shared codeword and generate a corrected shared codeword.

Box 620 is followed by box 625, which describes generating a modified shared codeword by modifying the plurality of data bits based on write data bits and modifying the plurality of metadata bits based on write metadata bits. The method 600 may include receiving the write data bits and write metadata bits from the controller. The method 600 may include overwriting at least a portion of the plurality of data bits with the write data bits and overwriting at least a portion of the plurality of metadata bits with the write metadata bits. In some embodiments, the method may include selecting a portion of the plurality of data bits and/or plurality of metadata bits to overwrite based on the column address. For example, a column plane select bit may be used to determine which portion of the data bits and/or metadata bits are overwritten.

Box 625 is followed by box 630, which describes generating an updated plurality of parity bits based on the modified shared codeword. The method 600 may include separating the shared codeword into the modified plurality of data bits and the modified plurality of metadata bits and storing the modified plurality of metadata bits.

Box 630 is followed by box 635 which describes writing the modified plurality of data bits and the updated plurality of parity bits to the memory array. The method 600 may include providing the second column select signal value and writing the data to the plurality of column planes and the parity to the extra column plane.

Box 635 may be followed by box 640 which describes writing the modified plurality of metadata bits to the memory array. The method 600 may include providing the first column select signal value to the selected column plane and writing the modified metadata bits to the selected column plane.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method comprising:
reading a plurality of metadata bits from a memory array;
reading a plurality of data bits and a plurality of parity bits from the memory array;
combining the plurality of data bits and the plurality of metadata bits into a shared codeword;
determining errors in the shared codeword based on the plurality of parity bits;
generating a modified shared codeword by modifying the plurality of data bits based on write data bits and modifying the plurality of metadata bits based on write metadata bits;
generating an updated plurality of parity bits based on the modified shared codeword;
writing the modified plurality of data bits and the updated plurality of parity bits to the memory array; and
writing the modified plurality of metadata bits to the memory array.

2. The method of claim 1, further comprising selecting half of the bits in the plurality of data bits in the shared codeword and modifying the selected half by overwriting them with the write bits.

3. The method of claim 1, further comprising:
reading the plurality of metadata bits as a first read access;
storing the plurality of metadata bits in a latch; and reading the plurality of data bits data and the plurality of parity bits as part of a second read access.

4. The method of claim 3, further comprising:
storing the modified plurality of metadata bits in the latch;
writing the modified plurality of data bits and the updated plurality of parity bits as part of a first write access; and
writing the modified plurality of metadata as part of a second write access.

5. The method of claim 1, further comprising:
selecting a first portion or a second portion of a plurality of column planes of the memory array based on a column plane select bit of a column address; and
reading the plurality of parity bits from the selected one of the first portion or the second portion.

6. The method of claim 1, further comprising:
providing a column select signal to a select one of a plurality of column planes and reading the plurality of metadata bits from the select one of the plurality of column planes; and
providing a column select signal to each of the plurality of column planes and reading the plurality of data bits from the plurality of column planes.

7. The method of claim 1, further comprising modifying a portion of the plurality of metadata bits by overwriting the portion with the write metadata.

8. An apparatus comprising:
at least one data terminal configured to receive write data and write metadata as part of a write operation;
a memory array;
an error correction code (ECC) circuit; and
a shared codeword logic circuit configured combine a plurality of data bits and plurality of metadata bits from the memory array to generate a shared codeword, wherein the ECC circuit is configured to determine errors in the shared codeword based on a plurality of parity bits from the memory array to generate a corrected shared codeword, and wherein the shared codeword logic circuit is further configured to modify the corrected shared codeword based on the write data and the write metadata to generate a modified shared codeword, wherein the modified shared codeword is written to the memory array.

9. The apparatus of claim 8, wherein the ECC circuit is configured to generate updated parity bits based on the modified shared codeword, and wherein the updated parity bits are written to the memory array.

10. The apparatus of claim 8, wherein the shared codeword logic circuit is configured to overwrite a selected portion of the data bits in the corrected shared codeword with the write data as part of generating the modified shared codeword.

11. The apparatus of claim 8, wherein the shared codeword logic circuit is configured to overwrite the metadata bits in the corrected shared codeword with the write metadata as part of generating the modified shared codeword.

12. The apparatus of claim 8, wherein the shared codeword logic circuit is configured to overwrite a selected portion of the metadata bits in the corrected shared codeword with the write metadata as part of generating the modified shared codeword.

13. The apparatus of claim 8, further comprising a column decoder configured to provide a read signal and a first column select signal to read the plurality of metadata as part of a first read access and configured to provide the read signal and a second column select signal to read the plurality of data bits as part of a second read access.

14. The apparatus of claim 13, wherein the column decoder is further configured to provide a write signal and the second column select signal to write a modified plurality of data bits from the modified shared codeword as part of a first write pass and configured to provide the write signal and the first column select signal to write a modified plurality of metadata bits from the modified shared codeword as part of a second write access.

15. An apparatus comprising:
a memory array comprising a plurality of data column planes and an extra column plane;
an error correction code (ECC) circuit; and
a column decoder, wherein responsive to a write operation the column decoder is configured to provide a first column select signal and a first read command to a selected one of the plurality of data column planes, provide a second column select signal and a second read command to each of the plurality of data column planes, provide the second column select signal and a first write command to each of the plurality of data column planes and provide the first column select signal and a second write command to the selected one of the plurality of data column planes, and
wherein responsive to the first and the second read command the ECC circuit is configured to receive a shared codeword comprising data and metadata from the memory array and correct the shared codeword based on parity bits from the memory array and wherein responsive to the first and the second write command a modified shared codeword based on the corrected shared codeword is written to the memory array.

16. The apparatus of claim 15, further comprising a shared codeword logic circuit configured to receive the data and the metadata responsive to the first and the second read command and configured to combine the data and the metadata from the array to generate the shared codeword.

17. The apparatus of claim 16, wherein the shared codeword logic is further configured to modify the corrected shared codeword with the write data and the write metadata,
wherein the ECC circuit is configured to generate updated parity based on the modified shared codeword, and
wherein the updated parity is written to the memory array responsive to the first write command.

18. The apparatus of claim 15 further comprising a latch circuit configured to store the metadata while the column decoder is providing the second read command and configured to store modified metadata from the modified shared codeword while the column decoder is providing the first write command.

19. The apparatus of claim 15, wherein responsive to a read operation the column decoder is configured to provide a third read command and the first column select signal to the selected one of the plurality of data column planes and to provide a fourth read command and the second column select signal to the plurality of data column planes.

20. The apparatus of claim 19, wherein the column decoder is further configured to provide the second column select signal to the extra column plane, and wherein the extra column plane is configured to store the parity bits before the write operation and the updated parity bits after the write operation.

\* \* \* \* \*